(12) United States Patent
Yang

(10) Patent No.: US 7,287,303 B2
(45) Date of Patent: Oct. 30, 2007

(54) EASY-TYPE UNIDIRECTIONAL LOCKING DEVICE

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 77 days.

(21) Appl. No.: 11/263,927

(22) Filed: Nov. 2, 2005

(65) Prior Publication Data

US 2007/0094851 A1    May 3, 2007

(51) Int. Cl.
*F16G 11/00* (2006.01)
(52) U.S. Cl. .................................. 24/134 R; 24/265 H
(58) Field of Classification Search .............. 24/115 R, 24/132 R, 134 R, 134 KB, 298, 300, 265 H
See application file for complete search history.

(56) References Cited

U.S. PATENT DOCUMENTS

| | | | | |
|---|---|---|---|---|
| 5,368,281 A | * | 11/1994 | Skyba | 254/391 |
| 6,068,242 A | * | 5/2000 | Kingery | 254/391 |
| 6,092,791 A | * | 7/2000 | Kingery | 254/371 |
| 6,149,133 A | * | 11/2000 | Skyba | 254/391 |
| 7,111,572 B1 | * | 9/2006 | Yang | 114/199 |

* cited by examiner

Primary Examiner—James R Brittain
(74) Attorney, Agent, or Firm—Troxell Law Office, PLLC

(57) ABSTRACT

An easy-type unidirectional locking device is primarily composed of a base and a lid, and is interiorly provided with a roller and an axle base which is provided at two sides with respective barriers, being controlled by a control knob installed outside of the lid. The axle base is resilience-retrievable via a spring connected with the control knob. A rope enters the entrance on the bottom of the locking device, passes by one barrier at one side of the axle base, goes around the roller, and then passes by the other barrier, and finally goes out of the exit. When the rope is drawn clockwise, the barriers at the axle base will clamp the rope, thereby accomplishing a unidirectional locking device.

3 Claims, 5 Drawing Sheets

EASY-TYPE UNIDIRECTIONAL LOCKING DEVICE

BACKGROUND OF THE INVENTION (a) Field of the Invention

The present invention relates to an easy-type unidirectional locking device, which, when being used in conjunction with a rope, can allow the rope to slide unidirectionally, thereby binding any objection and tightening the rope as desired. The invention is easy constructed, convenient for use, and particularly applicable to binding articles to prevent detachment during camping.

(b) Description of the Prior Art

When conducting outdoor activities, people used to carry cooking utilities, camp, clothing, food and beverages, etc. As such, the backpack might be great in size. Besides, the related camping rack and utilities might need be tied up by a rope. However, as a knotted rope is easily detached, it requires a locking device to tie up all the articles.

As disclosed in U.S. Pat. No. 5,368,281, the rope locking device is axially provided with a unidirectional ratchet, a rolling disk and a locking element. When the rope goes around the unidirectional ratchet and the rolling disk, it is locked by the unidirectional ratchet and the rolling disk, thereby forming a locking device for the unidirectionally sliding rope. When the locking element is pushed away to unidirectionally brake the rolling disk and allow it to countermarch, the rope may then be ejected. However, said disclosed locking device has numerous components, rendering the manufacture cost relatively high, the assembly work rather time-consuming, and the components are easily worn out.

In view of the above, the inventor has positively researched and disclosed a unidirectional rope locking device for tying up camping utilities. Accordingly, the more the user draws the rope, the firmer the rope would be tied up.

SUMMARY OF THE INVENTION

The primary object of the invention is to provide an easy-type unidirectional locking device, which is composed of few components and easily assembled, and can efficiently bind and position a rope to avoid looseness.

To obtain the above objects, the easy-type unidirectional locking device according to the invention is primarily composed of a base and a lid which is provided with structure substantially corresponding to that of the base. The locking device is interiorly provided with a roller and an axle base which is provided at two sides with respective barriers, being controlled by a control knob installed outside of the lid. The axle base is retrievable via a screw connected with the control knob. A rope enters the entrance on the bottom of the locking device, passes by one barrier at the axle base, goes around the roller, and then passes by another barrier and finally goes out of the exit. Accordingly, the rope can go through the locking device when being drawn counterclockwise, whereas the barriers at the axle base will retrieve its resilience and clamp the rope, thereby accomplishing a unidirectional locking device.

To completely appreciate these and other objects of the present invention as well as the invention itself, all of which will become apparent to those skilled in the art, the following detailed description of the invention and the claims should be read in conjunction with the accompanying drawings.

DETAILED DESCRIPTION OF THE PREFERRED EMBODIMENTS

Figure 1:
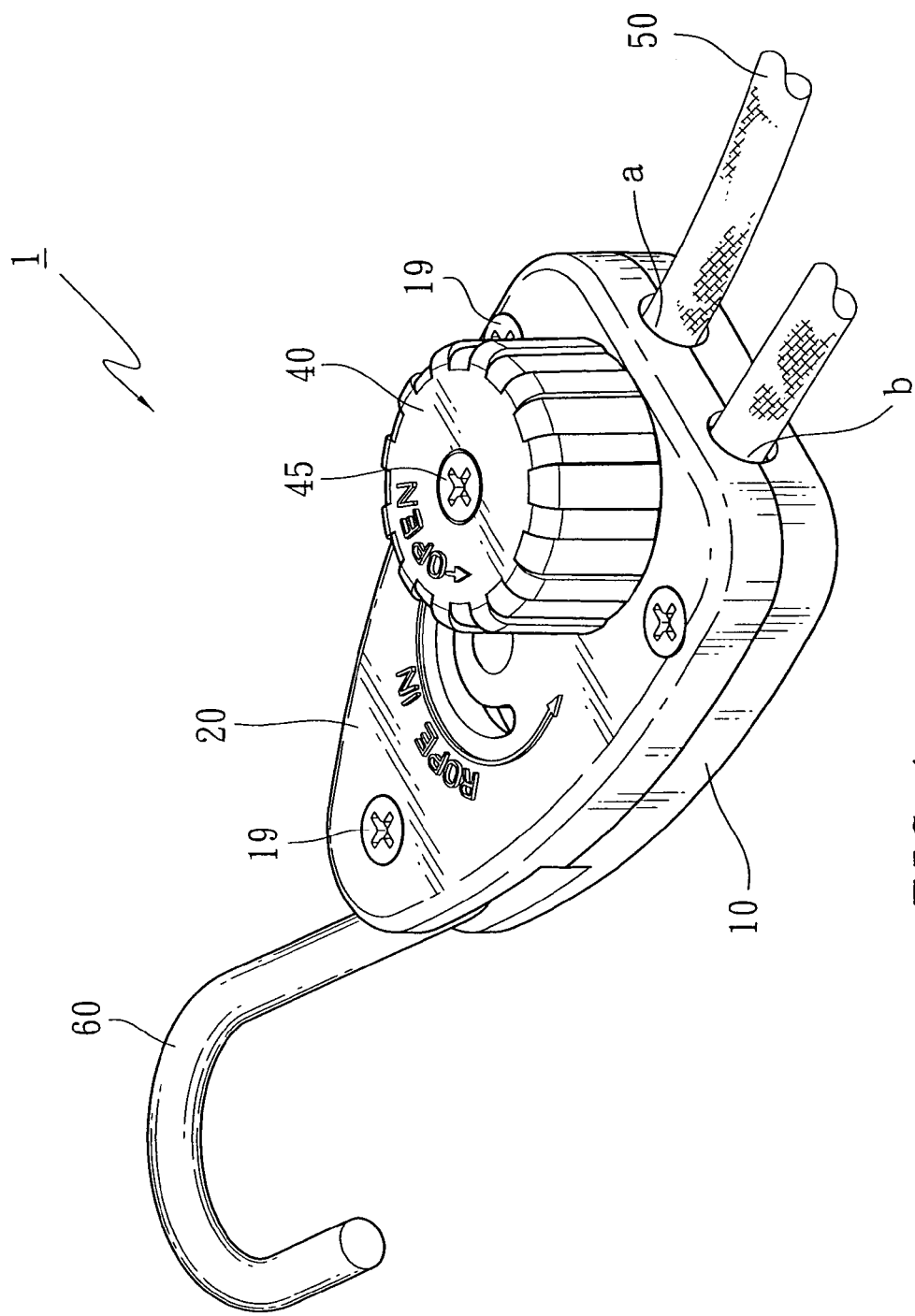
FIG. 1 is a perspective view of the present invention.

As shown in FIGS. 1 to 4, the locking device 1 according to the invention is primarily composed of a base 10, a lid 20, a roller 30, an axle base 35 and a control knob 40.

The base 10 is interiorly provided with a first recession 11 and a second recession 12. The first recession 11, having a central hole 13, can receive the roller 30, whereas the second recession 12, having a central positioning hole 14, can receive the axle base 35. The bottom of base 10 has a rope inlet notch 15a and a rope outlet notch 15b, both of which go through the first recession 11 and the second recession 12, and form an arc groove 15c along the inner side of the first recession 11. The front end of the base 10 has a protrusion 16 which is provided with a central post 17 having a screw hole 18a. A hook 60 is held onto the central post 17 of the base 10. Each of the two sides of the second recession 12 is provided with a screw hole 18b. The above-mentioned screws (18a, 18b) can receive screws 19 going through the screw holes (28a, 28b) of the lid 20 for fastening purposes.

Figure 2:
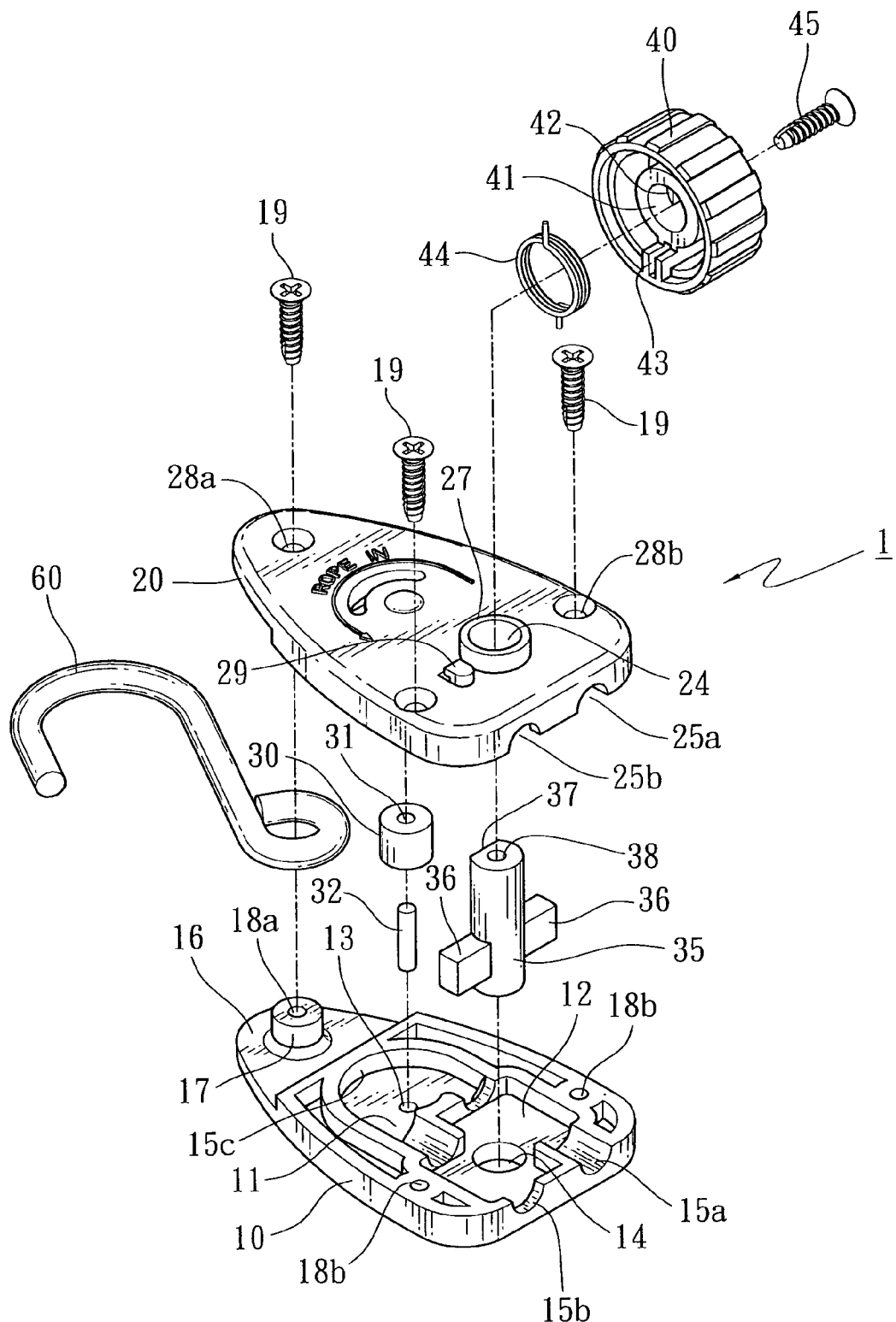
FIG. 2 is an exploded view of the present invention.
Figure 3:
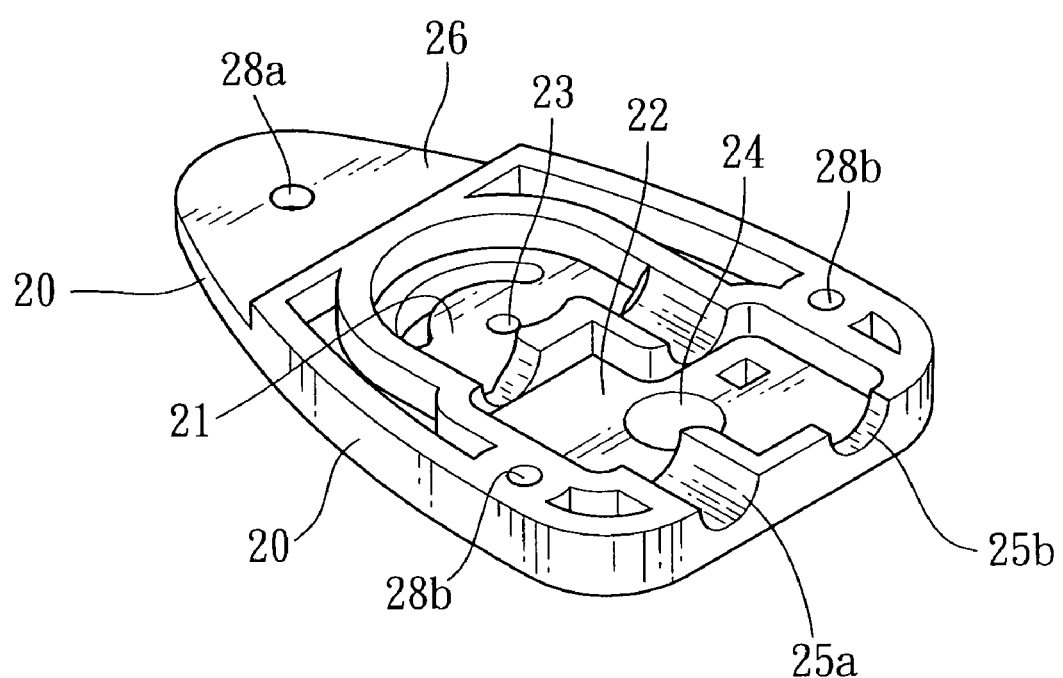
FIG. 3 is a bottom view of the lid according to the invention.

FIG. 3. is a bottom view of the lid 20, which has an outline corresponding to that of the base 10. The lid 20 is also interiorly provided with a first recession 21 having a central hole 23, and a second recession 22 having a through hole 24 within a protruding cylinder 27 (as shown in FIG. 2). Likewise, the bottom of lid 20 has two notches (25a, 25b) going through the first recession 21 and the second recession 22. The front end of the lid 20 has a protrusion 26 which is provided with a screw hole 28a, while each of the two sides of the second recession 12 has a screw hole 28b, such that the base 10 and the lid 20 can be combined.

The through hole 24 is within a protruding cylinder 27 which is mounted with a control knob 40 being fastened with a screw 45. The screw 45 goes through the knob 40 and is fastened to the screw hole 38 at the axle base 35. A locking hook 29 is provided at one side of the cylinder 27 for locking the spring 44.

A central hole 31 is provided at the roller 30 for receiving a central post 32.

The axle base 35 is provided with respective barriers 36 at the two sides, a locking plane 37 at the top of the exterior wall, and a screw hole 38 on the top end.

Figure 4:
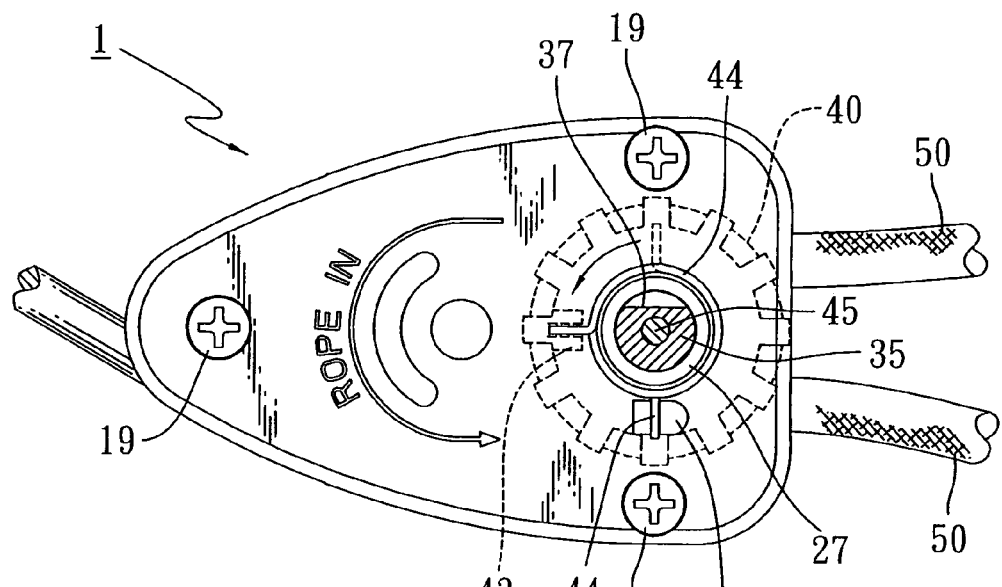
FIG. 4 is a top view of the invention.

The interior center of the control knob 40 has an axle hole 41 having a locking block 42 and a spring 44, one end of which would lock inside of the locking groove 43 of the control knob 40 (as shown in FIG. 4), while the other end of the spring 44 would lock with the locking hook 29. When assembling the locking device 1, the roller 30 is installed between the first recession 11 of the base 10 and first recession 21 of the lid 20, such that the center of the roller 30 is mounted on the central post 32 with the two ends of thereof engaged in the holes (13, 23), the bottom end of the axle base 35 inserted into the positioning hole 14 of the base 10, and the top end of the axle base 35 protruded out of the cylinder 27. Finally, the screw 19 goes through the screw holes (28a, 28b) from top to bottom into the screw holes (18a, 18b) of the base 10, such that the notches (15a, 15b) of the base 10 and the notches (25a, 25b) of the lid 20 would combine to form an inlet a and an outlet b for the rope 50. The axle hole 41 of the control knob 40 is mounted on the top of the axle base 35 with the locking block 42 engaged with the locking plane 37 of the axle base 35, such that when the control knob 40 is switched, the axle base 35 will synchronously switch, thereby one end of the spring 44 provided inside the control knob 44 would lock with the locking hook 29 of the lid 20 and retrieve its resilience after the control knob 40 is switched. After the screw 45 goes through the control knob 40 to fasten to the screw hole 38 of the axle base 35, the locking device 1 can be accomplished.

Figure 5:
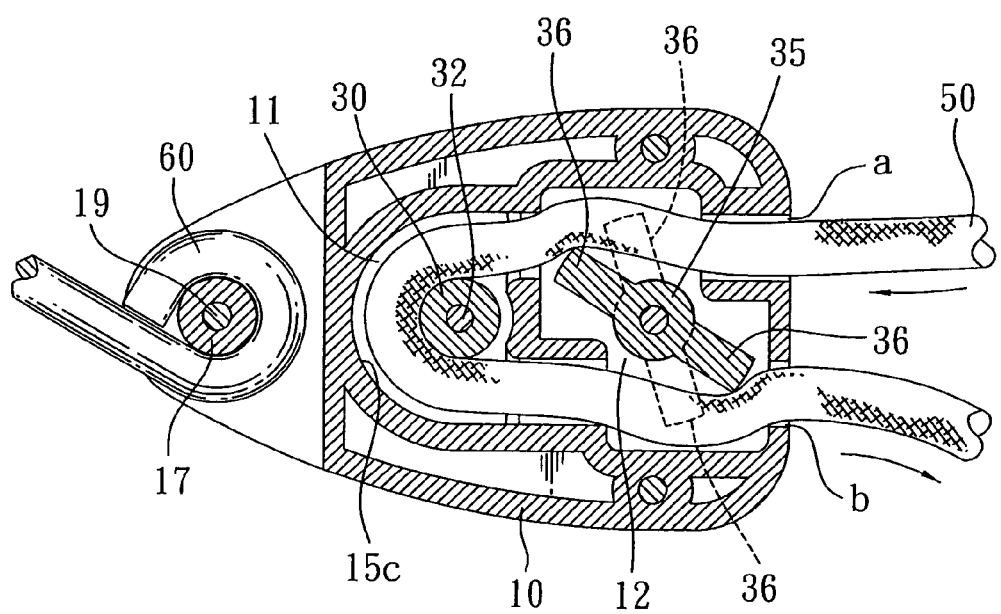
FIG. 5 shows how the rope is arranged inside the invention.
Figure 6:
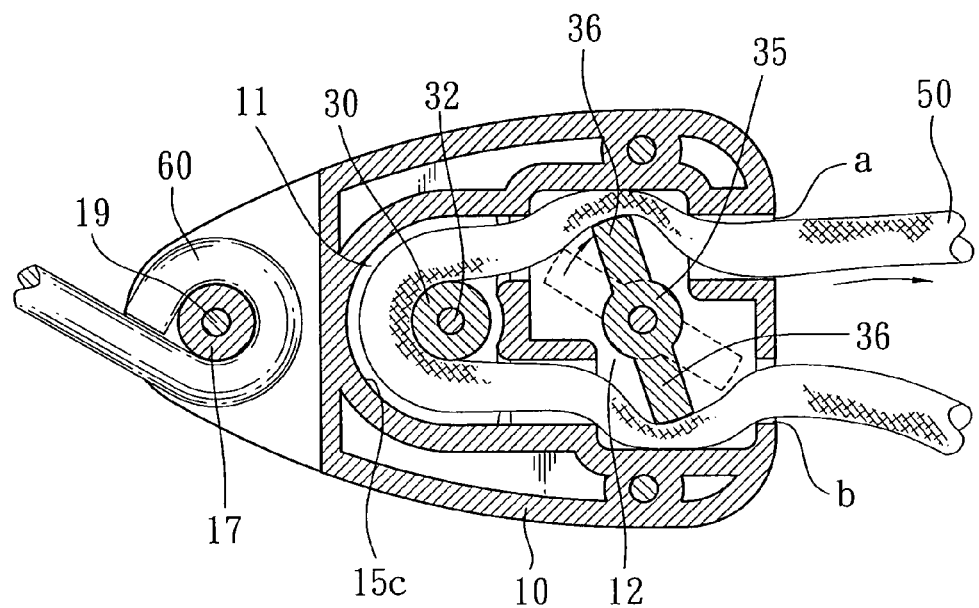
FIG. 6 shows rotating the axle base to clamp the rope.

As shown in FIGS. 5 and 6, the rope 50 enters the inlet a of the locking device 1, passes by the barrier 36 at one side of the axle base 35, goes around the roller 30 counterclockwise along the arc groove 15c, and then passes by the barrier 36 at the other side of the axle base 35, and finally exits the outlet b (as shown in FIG. 5). When the rope 50 is drawn at the inlet a end (i.e. clockwise), in view of the retried resilience of the spring 44, the barriers 36 of the axle base 35 would be trailed by the surface friction of the rope 50 and the two sides of the barriers 36 would clamp the moving rope 50 until it stops (as shown in FIG. 6). Accordingly, the rope 50 cannot be further drawn clockwise, thereby obtaining a unidirectional locking effect.

Figure 7:
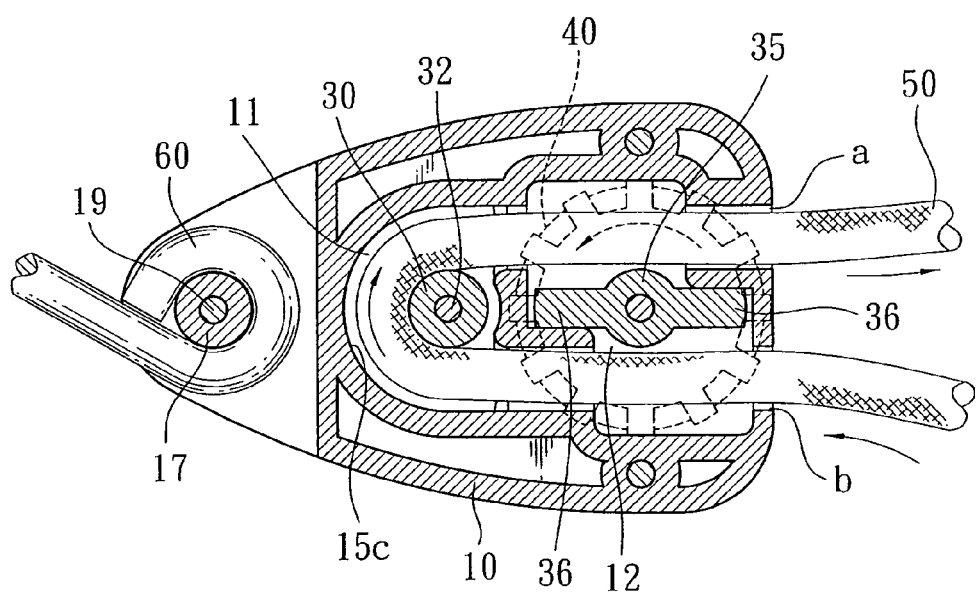
FIG. 7 shows rotating the axle base to release the rope.

Referring to FIG. 7, when the control knob 40 is manually switched counterclockwise, the barriers 36 at two sides of the axle base 35 would lean aside to avoid contact with the rope 50, thereby releasing the rope 50 which may then be drawn out of the inlet a.

Concluded above, the easy-type unidirectional locking device according to the invention, being easily constructed, can efficiently allow unidirectional slide, as well as countermarching after the control knob is switched away.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An unidirectional locking device, comprising a base and a lid, and interiorly provided with a roller and an axle base onto which a control knob is screwed, wherein,
    the base is interiorly provided with a first recession having a hole and a second recession having a positioning hole; a rear end of the base has an inlet notch and an outlet notch, both of which go through to the second recession, while a front end of the base has a protrusion having a central post;
    the lid is interiorly provided with a first recession having a hole and a second recession having a through hole within a protruding cylinder; a locking hook is provided beside the cylinder; a rear end of the lid has an inlet notch and an outlet notch, both of which go through to the second recession;
    the roller has a central hole, through which a central post passes, such that the central post can be positioned between the base and the hole of the first recession on the lid;
    the axle base is provided with a barrier at each of two sides, and a screw hole on a top, which goes out of the through hole of the cylinder on the lid; by way of a screw going through the control knob, the axle base can be combined and fastened to the control knob;
    the control knob is provided with an axle hole and a locking groove on an interior center and a side edge, respectively, and a spring inside, such that one end of the spring can lock with the locking groove, and that the spring can be held on the top of the axle base by the screw going through the control knob; and
    the lid is mounted on the base and integrally combined with the base via screws; the rope enters an entrance on a bottom of the locking device, passes by one barrier at the axle base, goes around the roller, and then passes by the other barrier, and finally goes out of an exit.

2. The unidirectional locking device according to claim 1, wherein the interior center of the control knob is provided with an axle hole, inside of which is provided with a locking block, while an exterior wall of the axle base is provided with a locking surface for interlocking with the locking block inside the control knob.

3. The unidirectional locking device according to claim 1, wherein a hook is held onto the central post of the base.

* * * * *